US008191269B1

(12) United States Patent
Hernandez et al.

(10) Patent No.: US 8,191,269 B1
(45) Date of Patent: Jun. 5, 2012

(54) LINE GAUGE DEVICE FOR AUTO BODY REPAIRS

(76) Inventors: Abner Hernandez, Miami, FL (US); Edith Carreno, Cliffside Park, NJ (US)

( * ) Notice: Subject to any disclaimer, the term of this patent is extended or adjusted under 35 U.S.C. 154(b) by 0 days.

(21) Appl. No.: 13/096,278

(22) Filed: Apr. 28, 2011

(51) Int. Cl.
*B43L 9/02* (2006.01)
*G01D 21/00* (2006.01)

(52) U.S. Cl. ........................................ 33/27.02; 33/600

(58) Field of Classification Search ................. 33/27.02, 33/27.03, 27.031, 27.032, 27.033
See application file for complete search history.

(56) References Cited

U.S. PATENT DOCUMENTS 3,089,246 A * 5/1963 Riepe .......................... 33/27.02
3,543,406 A * 12/1970 Kolb ........................... 33/27.02
3,628,251 A 12/1971 Feldl
D223,636 S * 5/1972 Finley ........................... D19/38
4,173,076 A 11/1979 Gossage
D322,630 S 12/1991 Ching-Guang
5,090,127 A * 2/1992 Shapiro et al. ............... 33/27.02
5,542,185 A * 8/1996 Boda ........................... 33/27.02
6,003,231 A * 12/1999 Leibeck et al. .............. 33/27.02
6,311,404 B1 11/2001 Smith
6,769,192 B2 8/2004 Johansson et al.
7,275,335 B2 10/2007 Holec et al.
7,937,843 B2 * 5/2011 Partes .......................... 33/27.02
2004/0226180 A1 * 11/2004 Solum .......................... 33/27.02
2008/0250658 A1 * 10/2008 Partes .......................... 33/27.02
* cited by examiner

*Primary Examiner* — Yaritza Guadalupe-McCall

(57) ABSTRACT

A line gauge device for constructing lines and contours on auto body components featuring a first pivot arm and a second pivot arm pivotally connected via a pivot component. The pivot arms can pivot toward and away from each other. The pivot component is biased to pivot the pivot arms away from each other. A threaded adjustment rod with a thumb wheel disposed in both the first and second pivot arms functions to secure the pivot arms in a particular position. A utensil holding component is disposed on the second end of the first pivot arm. A surface guide base with surface guide rollers is disposed on the second end of the second pivot arm.

3 Claims, 5 Drawing Sheets

LINE GAUGE DEVICE FOR AUTO BODY REPAIRS

FIELD OF THE INVENTION

The present invention is directed to an automobile repair tool, more particularly to a tool for creating lines and contours on damaged auto body component.

BACKGROUND OF THE INVENTION

Making auto body repairs on auto body components can be difficult. The present invention features a line gauge device for constructing lines and contours on auto body components. The lines and contours can help a mechanic repair the damage quickly and more evenly. The device of the present invention can be used on auto body components including but not limited to fenders, quarter panels, hoods, and other damaged automobile parts.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY

The present invention features a line gauge device for constructing lines and contours on auto body components. In some embodiments, the device comprises a first pivot arm and a second pivot arm pivotally connected via a pivot component that connects a first end of the first pivot arm and a first end of the second pivot arm, the pivot arms can pivot toward and away from each other, the pivot component is biased to pivot the pivot arms away from each other caused by a spring; a threaded adjustment rod functioning to secure the pivot arms in a particular position, the threaded adjustment rod extends from the first pivot arm through the second pivot arm, a first end of the threaded adjustment rod extending outwardly from the second pivot arm; a threaded thumb wheel disposed on the adjustment rod at or near the first end of the adjustment rod, the thumb wheel can rotate in a first direction toward the first pivot arm and second pivot arm or a second direction away from the second pivot arm, wherein when the thumb wheel is rotated in the first direction and contacts the second pivot arm, the thumb wheel puts pressure on the second pivot arm effectively causing the second pivot arm to pivot towards the first pivot arm and when the thumb wheel is rotated in the second direction the thumb wheel allows the second pivot arm to pivot away the first pivot arm; a utensil holding component disposed on a second end of the first pivot arm, the utensil holding component has an inner channel adapted to hold a writing utensil and align the writing utensil parallel to the first pivot arm, the writing utensil can slide up and down within the inner channel, wherein a locking knob engages the utensil holding component and functions to open and close the inner channel of the utensil holding component to respectively allow and prevent sliding of the writing utensil within the inner channel; and a surface guide base disposed on a second end of the second pivot arm and a pair of surface guide rollers disposed below the surface guide base and connected to the surface guide base via a pair of mounting plates, the surface guide rollers function to slidably contact an auto body panel.

In some embodiments, the line gauge device further comprises a handle extending outwardly from the surface guide base or surface guide rollers. In some embodiments, the surface guide base can pivot with respect to the second end of the second pivot arm.

DESCRIPTION OF PREFERRED EMBODIMENTS

Figure 1:
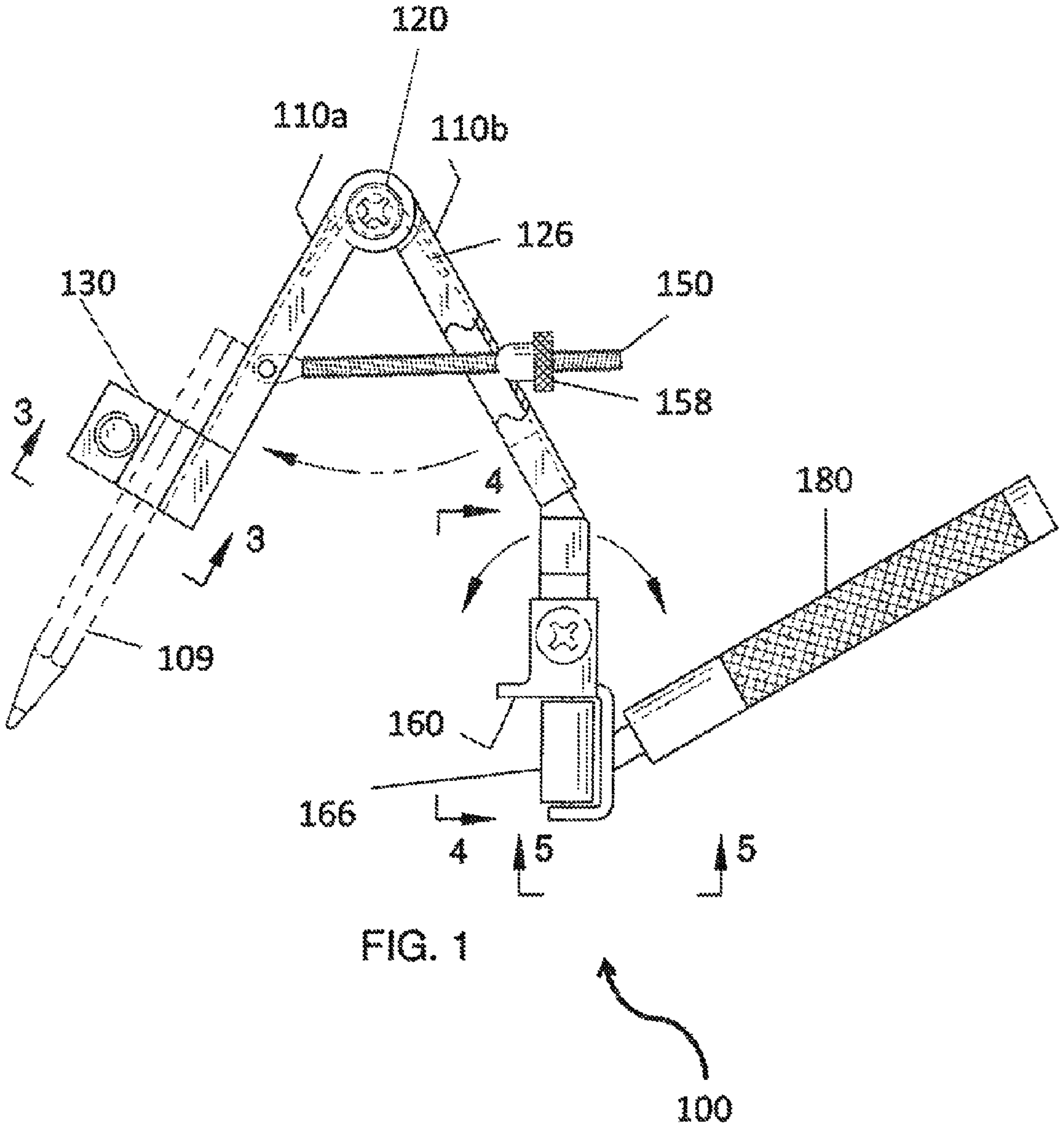
FIG. 1 is a side view of the line gauge device of the present invention.
Figure 2:
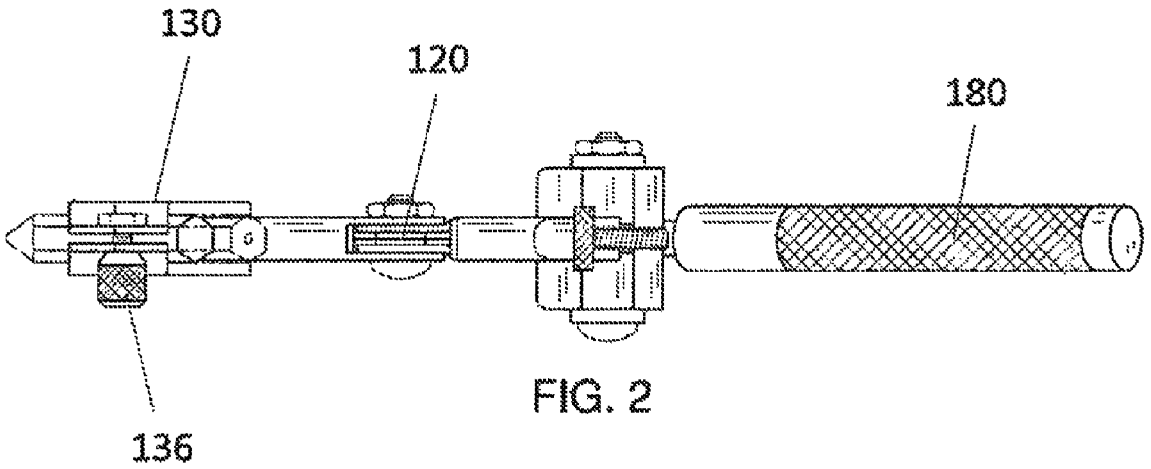
FIG. 2 is a top view of the line gauge device of the present invention.

Referring now to FIGS. 1-6, the present invention features a line gauge device 100 for constructing lines and contours on auto body components. The lines and contours can help a mechanic repair the damage quickly and more evenly. The device of the present invention can be used on auto body components including but not limited to fenders, quarter panels, hoods, and other damaged automobile parts.

The line gauge device 100 of the present invention comprises a first pivot arm 110*a* and a second pivot arm 110*b* pivotally connected via a pivot component 120 (e.g., the pivot component 120 is disposed on the first end of the first pivot arm 110*a* and the first end of the second pivot arm 110*b*). The pivot arms 110 can pivot toward and away from each other. In some embodiments, the pivot arms 110 can be secured in a particular position (e.g., at a particular angle with respect to each other) via a securing means. In some embodiments, the securing means engages the pivot component 120. In some embodiments, the securing means is an adjustment rod 150 that extends from the first pivot arm 110*a* through the second pivot arm 110*b*, the first end of the adjustment rod 150 extending outwardly from the second pivot arm 110*b* (see FIG. 1). The adjustment rod 150 is threaded. A threaded thumb wheel 158 is disposed on the adjustment rod 150 (e.g., at the first end). The thumb wheel 158 can rotate in a first direction (e.g., toward the first pivot arm 110*a* and second pivot arm 110*b*) or a second direction (e.g., away from the second pivot arm 110*b*). When the thumb wheel 158 is rotated in the first direction, the thumb wheel 158 puts pressure on the second pivot arm 110*b*, effectively causing the second pivot arm 110*b* to pivot towards the first pivot arm 110*a* (e.g., the pivot component 120 may bias the pivot arms 110 away from each other). When the thumb wheel 158 is rotated in the second direction, the thumb wheel 158 relieves pressure on the second pivot arm 110*b*, effectively causing the second pivot arm 110*b* to pivot away the first pivot arm 110*a* (e.g., the pivot component 120 may bias the pivot arms 110 away from each other).

In some embodiments, the angle between the first pivot arm 110*a* and the second pivot arm 110*b* is between about 0 to 30 degrees. In some embodiments, the angle between the first pivot arm 110*a* and the second pivot arm 110*b* is between about 30 to 60 degrees. In some embodiments, the angle between the first pivot arm 110*a* and the second pivot arm 110*b* is between about 60 to 90 degrees. In some embodiments, the angle between the first pivot arm 110*a* and the second pivot arm 110*b* is between about 90 to 120 degrees. In some embodiments, the angle between the first pivot arm

110*a* and the second pivot arm 110*b* is between about 120 to 150 degrees. In some embodiments, the angle between the first pivot arm 110*a* and the second pivot arm 110*b* is between about 150 to 180 degrees.

The pivot component 120 may bias the pivot arms 110 away from each other. For example, the pivot component 120 may comprise a spring 126 that function to push the pivot arms 110 away from each other (e.g., see FIG. 1 showing the spring 126 in phantom).

Figure 3:
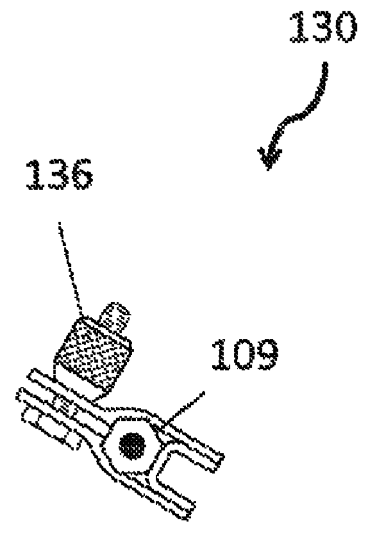
FIG. 3 is a bottom cross sectional view of the utensil holding component of the line gauge device of the present invention.

Disposed on the second end of the first pivot arm 110*a* is a utensil holding component 130. The utensil holding component 130 in FIG. 1 is shown holding a pencil, however the present invention is not limited to a pencil 109. The utensil (e.g., pencil 109) may be used to create a desired line across or around the body panel to be repaired. FIG. 3 shows a bottom cross sectional view of the utensil holding component 130 with the pencil 109. The utensil can be slid into the inner channel of the utensil holding component 130 and secured via a locking knob 136 (e.g., the locking knob 136 can be twisted in a first direction to respectively open and close the inner channel of the utensil holding component 130. Generally, the utensil holding component 130 aligns the utensil (e.g., pencil 109) with the first pivot arm 110*a* (e.g., see FIG. 1).

Disposed on the second end of the second pivot arm 110*b* is a surface guide. The surface guide comprises a surface guide base 160 disposed on the second end of the second pivot arm 110*b*. Disposed below the surface guide base 160 is a pair of surface guide rollers 166. The surface guide, for example the surface guide rollers 166, helps provide contact with the auto body panel when moving the device 100 along a surface (e.g., a fender).

Figure 4:
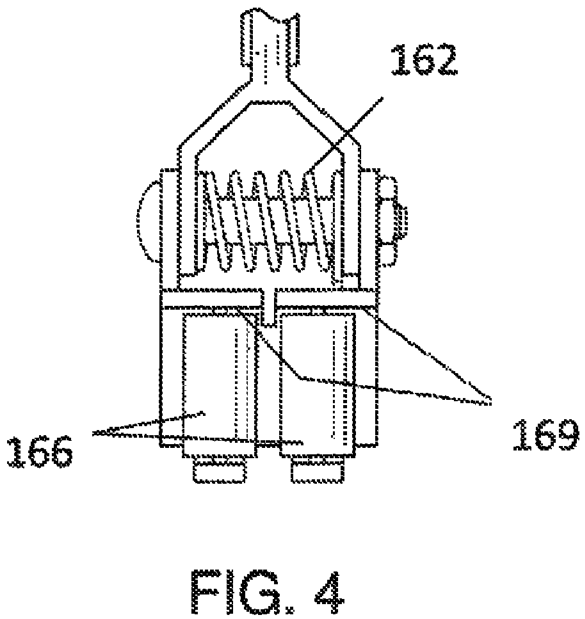
FIG. 4 is a side view of the surface guide of the line gauge device of the present invention.
Figure 5:
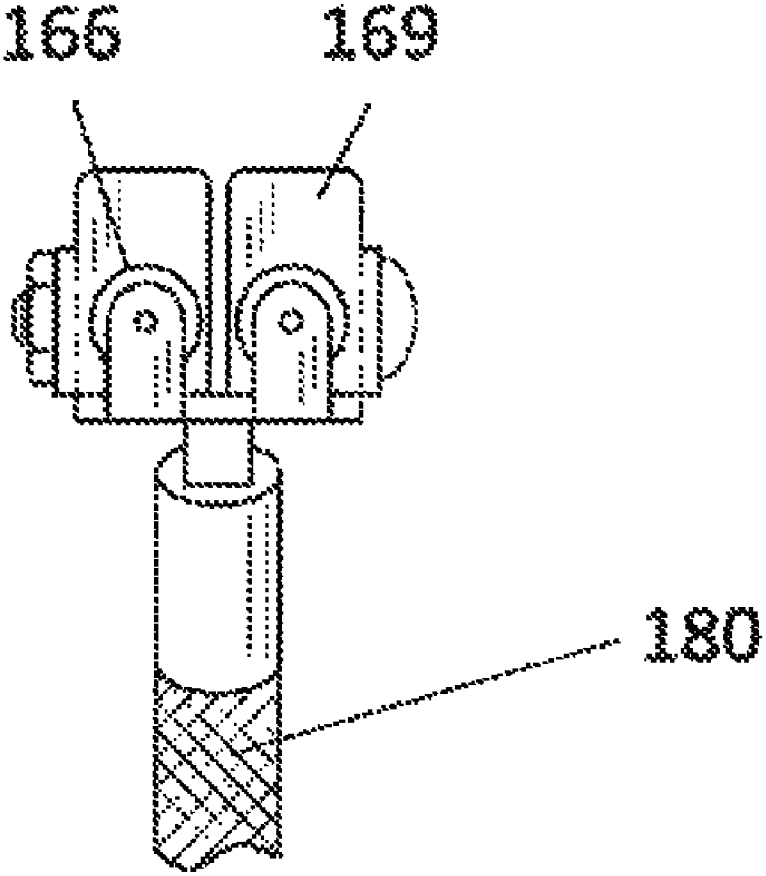
FIG. 5 is a bottom view of the surface guide of the line gauge device of the present invention.

As shown in FIG. 4 and FIG. 5, the surface guide base 160 comprises a surface guide spring 162 spanning an inner slot within the surface guide base 160. The pair of surface guide rollers 166 is positioned below the surface guide base 160 and is connected to the surface guide base 160 via a pair of mounting plates 169.

The device 100 further comprises a handle 180 extending outwardly from the second end of the second pivot arm 110*b* or the surface guide.

Figure 6:
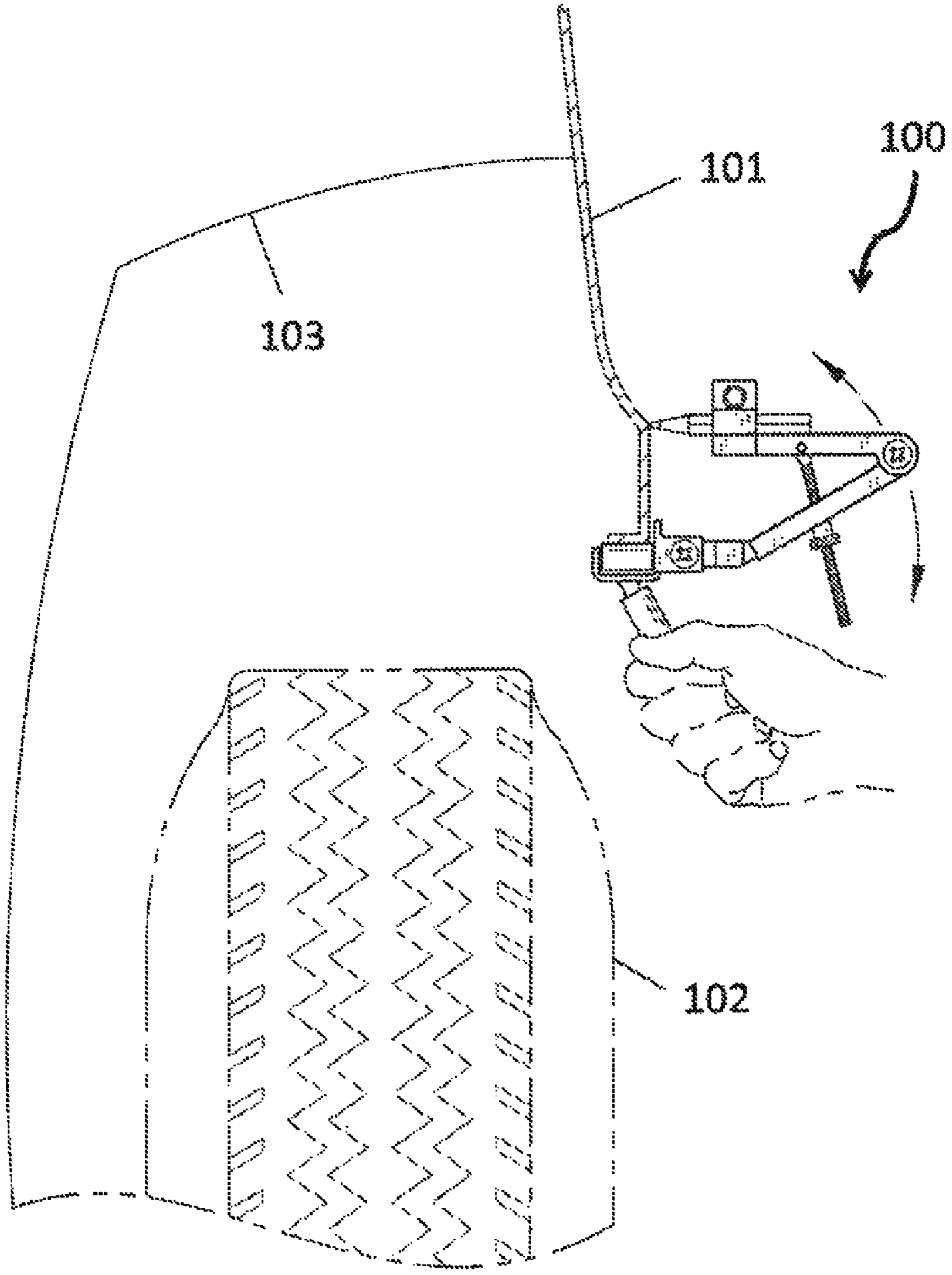
FIG. 6 is an in-use view of the line gauge device of the present invention.

FIG. 6 shows an in-use view of the device 100 of the present invention. The Device 100 is held against the fender 101 (e.g., above the tire 102 in the wheel well 103). In some embodiments, a user places the device 100 on an undamaged section of the body panel that is being repaired. The user then adjusts the device 100 to the most appropriate setting. The device 100 enables the user to lay down a guide line and then follow that guide line when performing the repair. This enables damaged body lines to be repaired in a fluid and uniform manner, especially when welding is required in the area.

As used herein, the term "about" refers to plus or minus 10% of the referenced number. For example, an embodiment wherein the angle between the pivot arms 110 is about 60 degrees includes an angle between the pivot arms 110 between 54 and 66 degrees.

The disclosures of the following U.S. Patents are incorporated in their entirety by reference herein: U.S. Pat. No. 7,275,335; U.S. Pat. No. 6,769,192; U.S. Pat. No. 3,628,251; U.S. Pat. No. 4,173,076; U.S. Pat. No. 6,311,404; U.S. Pat. No. D322,630.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

What is claimed is:

1. A line gauge device for constructing lines and contours on auto body components, said line gauge device comprising:

(a) a first pivot arm 110*a* and a second pivot arm 110*b* pivotally connected via a pivot component 120 that connects a first end of the first pivot arm 110*a* and a first end of the second pivot arm 110*b*, the pivot arms 110 can pivot toward and away from each other, the pivot component 120 is biased to pivot the pivot arms 110 away from each other caused by a spring 126;

(b) a threaded adjustment rod 150 functioning to secure the pivot arms 110 in a particular position, the threaded adjustment rod 150 extends from the first pivot arm 110*a* through the second pivot arm 110*b*, a first end of the threaded adjustment rod 150 extending outwardly from the second pivot arm 110*b;*

(c) a threaded thumb wheel 158 disposed on the adjustment rod 150 at or near the first end of the adjustment rod 150, the thumb wheel 158 can rotate in a first direction toward the first pivot arm 110*a* and second pivot arm 110*b* or a second direction away from the second pivot arm 110*b*, wherein when the thumb wheel 158 is rotated in the first direction and contacts the second pivot arm 110*b*, the thumb wheel 158 puts pressure on the second pivot arm 110*b* effectively causing the second pivot arm 110*b* to pivot towards the first pivot arm 110*a* and when the thumb wheel 158 is rotated in the second direction the thumb wheel 158 allows the second pivot arm 110*b* to pivot away the first pivot arm 110*a;*

(d) a utensil holding component 130 disposed on a second end of the first pivot arm 110*a*, the utensil holding component 130 has an inner channel adapted to hold a writing utensil and align the writing utensil parallel to the first pivot arm 110*a*, the writing utensil can slide up and down within the inner channel, wherein a locking knob 136 engages the utensil holding component and functions to open and close the inner channel of the utensil holding component to respectively allow and prevent sliding of the writing utensil within the inner channel; and (e) a surface guide base 160 disposed on a second end of the second pivot arm 110*b* and a pair of surface guide rollers 166 disposed below the surface guide base 160 and connected to the surface guide base via a pair of mounting plates 169, the surface guide rollers 166 function to slidably contact an auto body panel.

2. The line gauge device of claim 1 further comprising a handle 180 extending outwardly from the surface guide base 160 or surface guide rollers 166.

3. The line gauge device of claim 1, wherein the surface guide base 160 can pivot with respect to the second end of the second pivot arm 110*b*.

* * * * *